(12) United States Patent
Marfia et al.

(10) Patent No.: US 9,602,551 B2
(45) Date of Patent: Mar. 21, 2017

(54) METHOD FOR PROVIDING A LAW ENFORCEMENT AGENCY WITH SAMPLED CONTENT OF COMMUNICATIONS

(71) Applicant: TELEFONAKTIEBOLAGET L M ERICSSON (PUBL), Stockholm (SE)

(72) Inventors: Francesca Marfia, Bianco (IT); Lorenzo Fiorillo, San Nicola la Strada (IT)

(73) Assignee: TELEFONAKTIEBOLAGET L M ERCISSON, Stockholm (SE)

( * ) Notice: Subject to any disclaimer, the term of this patent is extended or adjusted under 35 U.S.C. 154(b) by 0 days.

(21) Appl. No.: 14/443,014

(22) PCT Filed: Nov. 15, 2012

(86) PCT No.: PCT/SE2012/051265
§ 371 (c)(1),
(2) Date: May 14, 2015

(87) PCT Pub. No.: WO2014/077748
PCT Pub. Date: May 22, 2014

(65) Prior Publication Data
US 2015/0341392 A1    Nov. 26, 2015

(51) Int. Cl.
*H04L 12/16* (2006.01)
*H04L 29/06* (2006.01)

(52) U.S. Cl.
CPC .................. *H04L 63/306* (2013.01)

(58) Field of Classification Search
CPC ....... H04L 63/306; H04L 63/30; H04L 63/00; H04L 63/304; H04M 3/2281; H04M 7/006; H04M 2207/18; H04M 2207/14
See application file for complete search history.

(56) References Cited

U.S. PATENT DOCUMENTS

| 2004/0255126 A1* | 12/2004 | Reith | .................... H04L 63/083 713/183 |
| 2005/0152275 A1* | 7/2005 | Laurila | .................... H04L 43/18 370/241 |

(Continued)

FOREIGN PATENT DOCUMENTS

| EP | 1389862 A1 | 2/2004 |
| WO | 2008040583 A1 | 4/2008 |
| WO | 2009021546 A1 | 2/2009 |

OTHER PUBLICATIONS

Schulzrinne, et al.; Network Working Group; Request for Comments: 3550; RTP: A Transport Protocol for Real-Time Applications; Jul. 2003.

(Continued)

*Primary Examiner* — Abdelnabi O Musa
(74) *Attorney, Agent, or Firm* — Patents on Demand, P.A.; Brian K. Buchheit; Scott M. Garrett

(57) ABSTRACT

Presented are a method and a node in a Lawful Interception (LI) network, in which the node is configured to provide a Law Enforcement Agency with Intercept Related Information (IRI) and Content of Communications (CC) of data traffic in a digital communications network. The IRI and CC are forwarded to an Intercept Mediation and Delivery unit node (IMDU) of the LI network, wherein the IMDU is configured to sample the content of communications according to a certain sampling rate to achieve one or more samples of the CC, and to forward the generated one or more samples to the Law Enforcement Agency.

15 Claims, 8 Drawing Sheets

(56) References Cited

U.S. PATENT DOCUMENTS

| | | | |
|---|---|---|---|
| 2006/0264200 A1* | 11/2006 | Laiho | H04M 3/2281 455/410 |
| 2007/0297418 A1 | 12/2007 | Lee | |
| 2009/0097420 A1* | 4/2009 | Chiang | H04L 63/306 370/259 |
| 2010/0086119 A1* | 4/2010 | De Luca | H04M 3/2281 379/213.01 |
| 2013/0144979 A1* | 6/2013 | Kansal | H04N 21/23106 709/219 |
| 2015/0016413 A1* | 1/2015 | Sirotkin | H04L 5/0057 370/331 |
| 2016/0080423 A1* | 3/2016 | Milinski | H04L 63/304 726/1 |

OTHER PUBLICATIONS

Ott, et al.; Network Working Group; Request for Comments: 4629; "RTP Payload Format for ITU-T Rec. H.263 Video," Jan. 2007.

ETSI TS 102 232-3 V2.3.1; Technical Specification: Lawful Interception (LI); Handover Interface and Service-Specific Details (SSD) for IP delivery; Part 3: Service-specific details for internet access services; Aug. 2011.

3GPP TS 33.106 V9.0.0; 3rd Generation Partnership Project; Technical Specification Group Services and System Aspects; 3G security; Lawful Interception requirements (Release 9); Dec. 2009.

3GPP TS 33.107 V9.0.0; 3rd Generation Partnership Project; Technical Specification Group Services and System Aspects; 3G security; Lawful Interception architecture and functions (Release 9); Dec. 2009.

3GPP TS 33.108 V9.1.0; 3rd Generation Partnership Project; Technical Specification Group Services and System Aspects; 3G security; Handover interface for Lawful Interception (LI) (Release 9); Dec. 2009.

ETSI TS 102 232-3 V2.2.1; Lawful Interception (LI); Handover Interface and Service-Specific Details (SSD) for IP delivery; Part 3: Service-specific details for internet access services; Jan. 2009.

3GPP TS 33.107 V10.0.0; 3rd Generation Partnership Project; Technical Specification Group Services and System Aspects; 3G security; Lawful interception architecture and functions (Release 10); Jun. 2010.

3GPP TS 33.108 V10.0.0; 3rd Generation Partnership Project; Technical Specification Group Services and System Aspects; 3G security; Handover interface for Lawful Interception (LI) (Release 10); Jun. 2010.

* cited by examiner

METHOD FOR PROVIDING A LAW ENFORCEMENT AGENCY WITH SAMPLED CONTENT OF COMMUNICATIONS

This application is a 371 of International Application PCT/SE2012/051265, filed Nov. 15, 2012, the disclosure of which is fully incorporated herein by reference.

TECHNICAL FIELD

The present disclosure is related to Lawful Interception. More particularly, the disclosure presents a method, an arrangement, mediation function entities and a computer program product for providing a Law Enforcement Agency with sampled Content of Communications.

BACKGROUND

FIG. 1 is a block diagram of an exemplary Lawful Interception (LI) system and network 10 according to prior art. Said system and network comprises a number of entities. The exemplary LI system comprises a Law Enforcement Management Function, LEMF, 12 for requesting LI services of the LI system and collecting intercepted information of Intercepting Control Elements, ICEs, in the system. The system shall provide access to the intercepted Content of Communications, CC, and Intercept Related Information, IRI, of a target and services related to the target on behalf of one or more Law Enforcement Agencies, LEAs 80. An intercept request, also denoted Request for LI activation, is sent through a first Handover Interface, HI1, located between the Law Enforcement Management Function 12 and an Intercept Mediation and Delivery Unit, IMDU, 14 comprising a Mediation Function, MF, 16 and an Administration Function, ADMF, 18. Said Mediation Function 16 and Administration Function 18 generates based on said received request a warrant comprising said one or more target identities, and sends said warrant towards an Intercepting Control Element, ICE, 20 via an interface denoted X1_1. The ICE 20 may be connected to a node of a network, e.g. the Internet, a 3 GMS (third generation Mobile Communications System), etc., from which it intercepts said Content of Communications and Intercept Related Information of a mobile target. Said CC and IRI are network related data. As reference to the standard model, see references [1], [2] and [3], the content of communication is intercepted in the ICE network node and it is based upon duplication of target communication payload without modification. In reference [3], the interfaces HI1 and HI2 is specified in more detail. The ICE sends IRI raw data via an interface X2 to a Delivery Function for IRI reporting, DF2, 24 and a Mediation Function of IRI, MF2, 22 that generates and delivers to a collection functionality a standardized IRI report based on the received IRI report. Said standardized IRI report is sent over a standardized interface HI2 to the LEMF 12. The ICE 20 also sends CC raw data via an interface X3 to a Delivery Function for CC reporting, DF3, 26 and a Mediation Function of CC, MF3, 28 which generates and delivers to a collection functionality a standardized CC report based on the received CC report. Said standardized CC report is sent over a standardized interface HI3 to the requesting LEMF 12.

The HI2 and HI3-interfaces represent the interfaces between the LEA and two delivery functions. The delivery functions are used:
to distribute the Intercept Related Information (IRI) to the relevant LEA(s) via HI2;
to distribute the Content of Communication (CC) to the relevant LEA(s) via HI3.

According to known internet access services, all the IP streams related to a given target is intercepted and delivered as a whole session data flow regardless any service used within an interception session.

IP Services and bandwidth offered per each subscriber is dramatically increasing.

Although in many countries the communication path between Telecom Operators and LEAs is constantly improved, the available bandwidth is still a precious resource to be carefully preserved.

Many LEAs request the operators to receive only the payload which is considered relevant for their investigations and to discard non-relevant voluminous data like P2P movies, IPTV, VOD in the operator domain.

This is usually provided by filtering out specific voluminous content in the operator domain by means of real time Deep Packet Inspection/Decoding techniques.

International press quotes more and more cases of hidden content inside data used by criminals for exchange of messages. Besides "Steganography", a simple method might be to include piece of a self-made movie, bringing secret messages, within an ordinary movie swapped in a P2P session.

The presence of hidden messages would not be revealed when using filtering in the operator domain, not even when metadata is available.

E.g. the metadata might report:
Source IP address 192.134.0.1
Filename: "MonstersIncByPixar"
... while, the actual content might be full of pieces of movie of other kind. If a LEA needs to access specific contents embedded in the whole session streams, it becomes necessary to do an appropriate post-processing of the intercepted data to find the data content of interest.

SUMMARY

The post-processing of the intercepted data to find hidden content in intercepted data is often very time consuming. It takes a lot of time to look through and check the intercepted data if said data is an enormous amount of data.

One object of this disclosure is to provide a solution for said problem.

Said problem is solved according to the following disclosure by providing different embodiments of a method and an arrangement in a Lawful Interception system.

A method and embodiments thereof are provided, said method being applicable in a Lawful Interception, LI, network for providing a Law Enforcement Agency with Intercept Related Information, IRI, and Content of Communications, CC, from data traffic in a digital communications network. The data traffic is related to one or more target identities and interceptable by means of an Intercepting Control Element in a common node of said LI network and digital communications network. The Intercepting Control Element is configured to receive a request to intercept data traffic related to one or more target identities, collect IRI and CC related to said one or more requested target identities, and forward the IRI and CC to an Intercept Mediation and Delivery unit node of the LI network. The method comprises sampling the CC according to a certain sampling rate to achieve one or more samples and forwarding the generated one or more samples to the Law Enforcement Agency.

Further an arrangement and embodiments thereof is provided. The arrangement is provided in a node a Lawful Interception, LI, network. The arrangement being configured to provide a Law Enforcement Agency with Intercept Related Information, IRI, and Content of Communications, CC, of data traffic in a digital communications network. The data traffic comprises data traffic being related to one or more target identities and intercepted by means of an Intercepting Control Element in a common node of said LI network and digital communications network. Said Intercepting Control Element is configured to receive a request to intercept data traffic related to one or more target identities, collect IRI and CC related to said one or more requested target identities, and forward the IRI and CC to an Intercept Mediation and Delivery unit node of the LI network. The Intercept Mediation and Delivery unit comprises a sampling filter, which is configured to sample the content of communications according a certain sampling rate to achieve one or more samples of the CC. The Intercept Mediation and Delivery unit is configured to forward the generated one or more samples to the Law Enforcement Agency.

Moreover, a third Mediation Function entity is provided. Said entity is configured to be inserted in an arrangement in a Lawful Interception, LI, network. Said arrangement is configured to provide a Law Enforcement Agency with Intercept Related Information, IRI, and Content of Communications, CC, of data traffic in a digital communications network, said data traffic comprising data traffic being related to one or more target identities and intercepted by means of an Intercepting Control Element, in a common node of said LI network and digital communications network. Said Intercepting Control Element is configured to receive a request to intercept data traffic related to one or more target identities, collect IRI and CC related to said one or more requested target identities, and forward the IRI and CC to the arrangement comprising an Intercept Mediation and Delivery unit, wherein the Mediation Function entity comprises a sampling filter, which is configured to sample the CC according a certain sampling rate to achieve one or more samples of the CC, and to forward the generated one or more samples.

Additionally, a second Mediation Function entity is provided. Said entity is configured to be inserted in an arrangement in a Lawful Interception, LI, network. Said arrangement being configured to provide a Law Enforcement Agency with Intercept Related Information, IRI, and Content of Communications, CC, of data traffic in a digital communications network, said data traffic comprising data traffic being related to one or more target identities and intercepted by means of an Intercepting Control Element, in a common node of said LI network and digital communications network. The Intercepting Control Element is configured to receive a request to intercept data traffic related to one or more target identities, collect IRI and CC related to said one or more requested target identities, and forward the IRI and CC to the arrangement comprising an Intercept Mediation and Delivery unit. The Mediation Function entity comprises a collecting means, which is configured to collect metadata from the received Intercept Related Information, and an inserting means configured to insert said metadata into an Intercept Related Information, IRI, report to be forwarded the IRI report via a second Handover Interface to the Law Enforcement Agency node.

Different embodiments of the method, arrangement and entities are provided in the dependent claims.

One advantage of the sampling functionality provided by the method and arrangement is that it reduces the amount of data to be transferred to the Law Enforcement Agency.

Further one advantage is that the sampling functionality reduces the amount of data to be checked for hidden content in the intercepted data traffic.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 2:
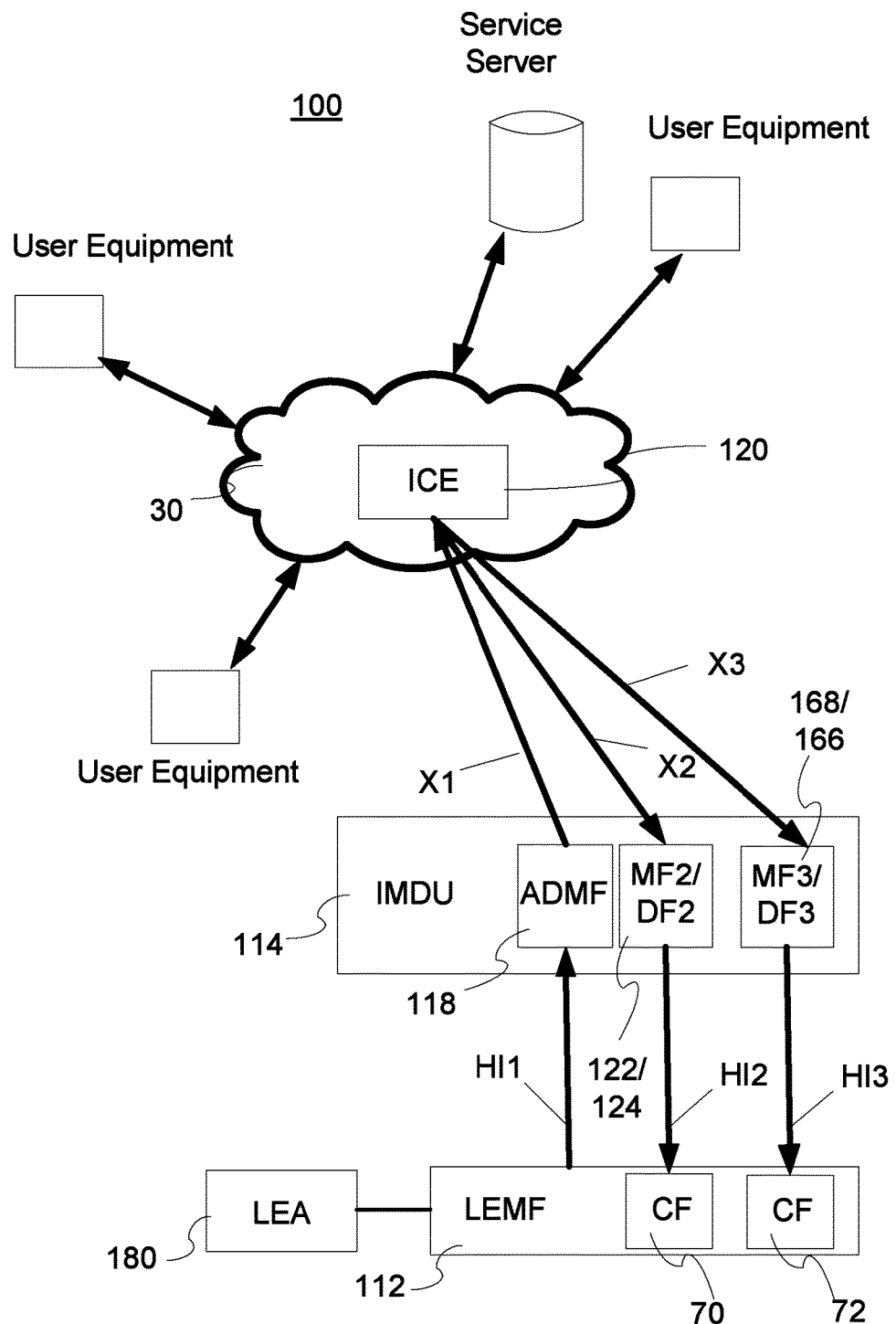
FIG. 2 is a block diagram illustrating an implementation of an exemplary Lawful Interception System and Network wherein arrangement and methods described herein may be implemented.

FIG. 2 illustrates an example of a Lawful Interception (LI) system and network wherein the different embodiments of the present method, entities and arrangement are applicable.

Figure 1:
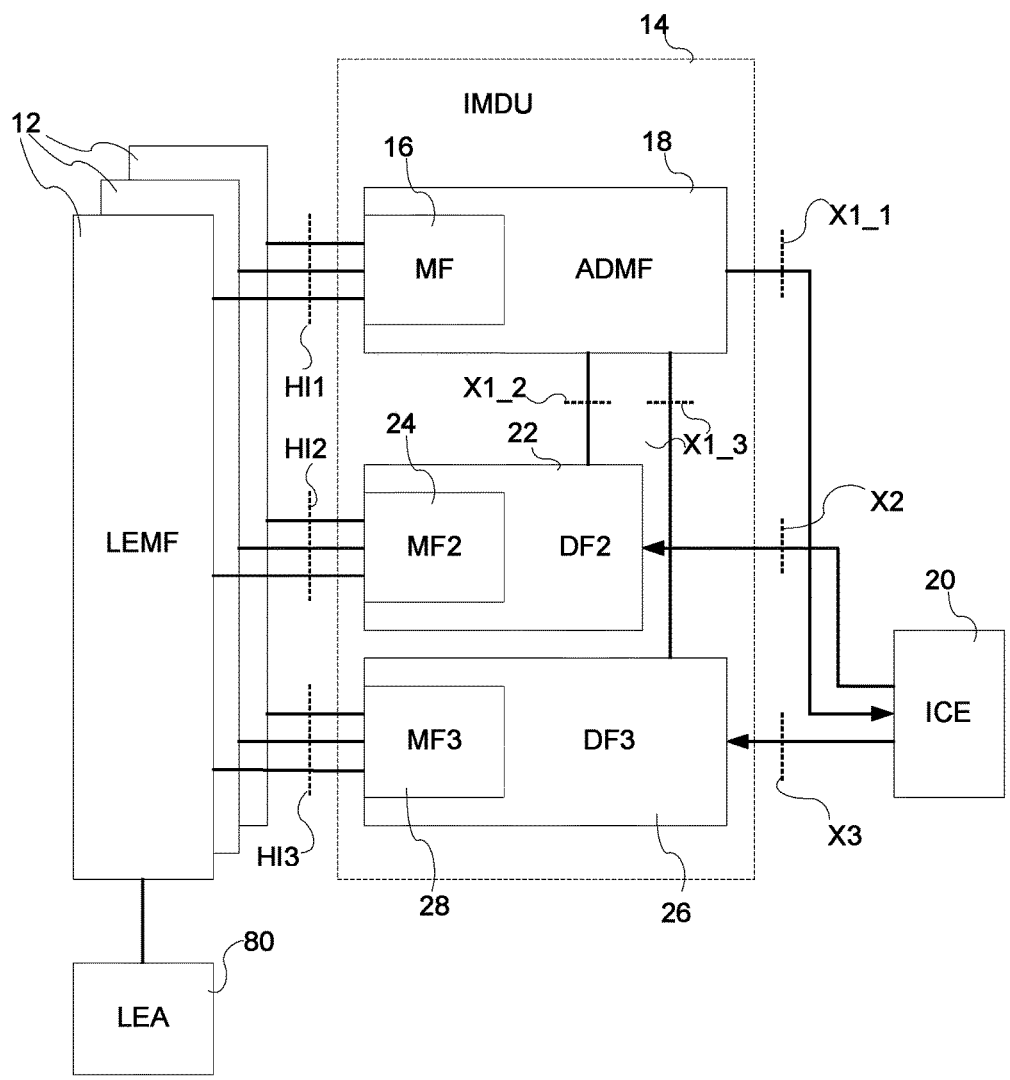
FIG. 1 is a block diagram illustrating a Lawful Interception System and Network according to prior art.

Lawful Interception (LI) system and network 100 basically comprises the same and corresponding blocks and functionalities as described above in the system and network illustrated in FIG. 1. Thus, the Law Enforcement Agency 180 is illustrated to be connected to Law Enforcement Management Function, LEMF, 112. However, in some embodiments LEA 180 may be regarded as a node in the system and network, in which node the LEMF 112 is situated. The LEMF 112 provides data and information that is a result of a Lawful Interception session performed by a network operator in the operator domain of the system, as already has been described in the background section of this disclosure. The LEMF 112 may comprise Collection Functions CFs 70, 72 for collecting data received from the IMDU 114.

The operator domain of the LI system involves the Intercept Mediation and Delivery Unit, IMDU, 114 comprising a Mediation Function, MF (not shown) and an Administration Function, ADMF, 118. The IMDU further comprises a second Mediation Function MF2 122, a second Delivery Function DF2 124, third Mediation Function MF3 166, and a third Mediation Function DF3 168.

As already described in the background section of this disclosure, the LI system comprises a number of interfaces. Interfaces HI1, HI2 and HI3 are links between the entities of LEMF 112 and IMDU 114. Interfaces X1 (or X1_1), X2 and X3 are links between an Intercepting Control Element ICE 120 and the entities of the IMDU 114. Which entities that are inter-connected by which interface are illustrated in FIG. 2.

An Intercepting Control Element, ICE, 120 is applied to a node of an operator's network 30. Said node may be considered as a common node for the LI system and network and an operator's communication network. In said node, the ICE is capable of intercepting numerous of data traffic and communication between different users, and users and different service nodes providing different services, e.g. Voice-over-IP (VoIP), Video-on-Demand (VoD), etc. If a user is a requested target registered by the ICE 120, the ICE starts an interception session, wherein the signalling traffic of the target is sent as IRI data comprising metadata and the payload of the data traffic is sent as Content of Communications CC to the IMDU 114 of the operator's LI system.

The present invention introduces a mechanism for sampling the intercepted video/audio streaming and for sending the LEA 180 just samples taken from the intercepted audio/video streaming or P2P (peer-to-peer) sessions at regular intervals, instead of the whole content. As illustrated in FIG. 2, such P2P sessions may take place between Users' User Equipments (EU) or Users' Equipments and Service Servers over an operator's network 30.

An object of this disclosure is to introduce a new mechanism to be used in conjunction to the available payload filtering and metadata techniques by allowing the LEA to mitigate the risk of targets exchanging hidden messages.

It is proposed to introduce the option to send to the LEA only samples which are fragments of the intercepted payload, taken at regular (configurable) sampling rate, instead of the whole content.

Once the LI application, in the operator domain, identifies a flow of packets belonging to a video or audio content, then a sample e.g. a snapshot, a video frame in case of video or some seconds of samples in case of audio, are taken from the flow. Said sample are sent to the LEA, at regular intervals according to the timeframe agreed between the telecom operator and LEA.

Figure 3:
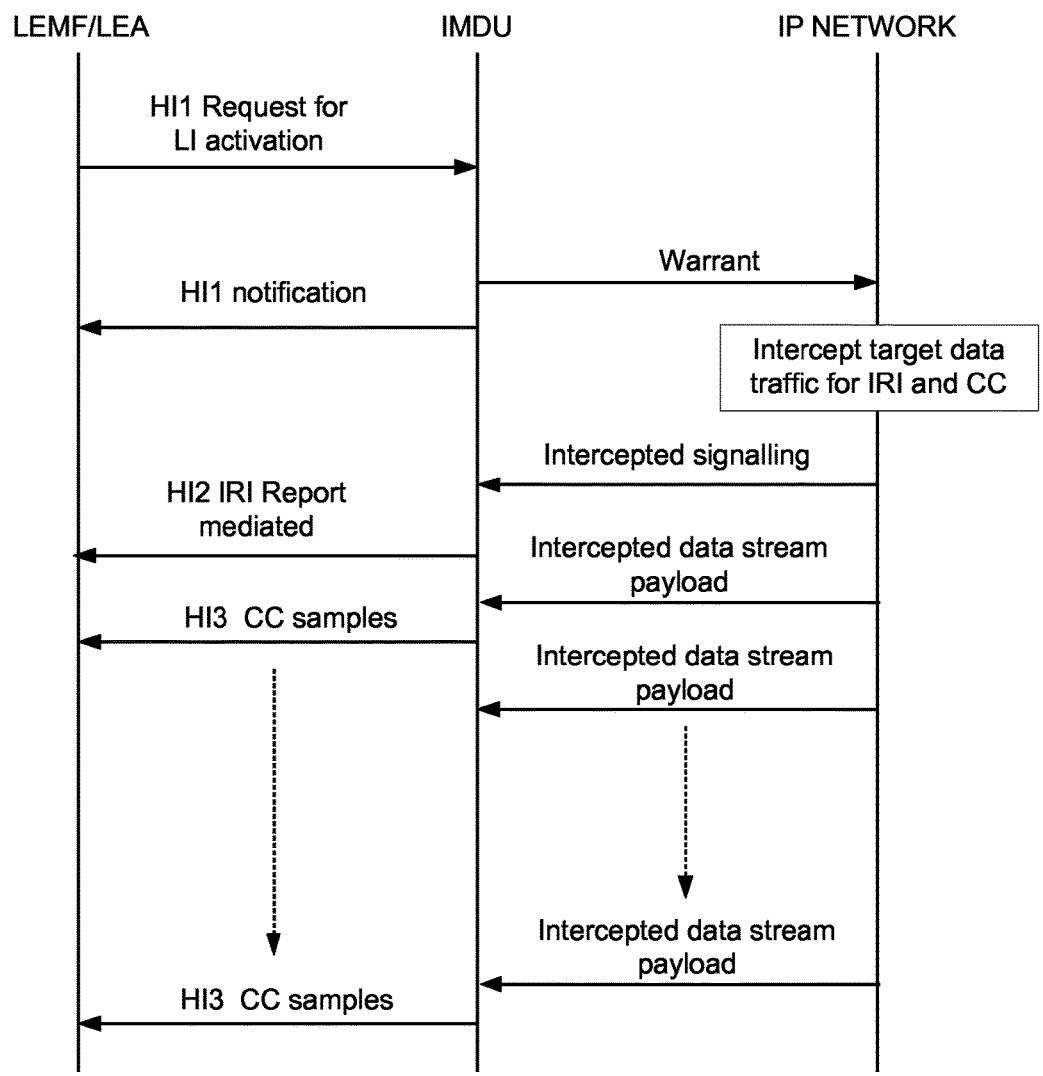
FIG. 3 is a message and signalling chart illustrating flow of messages when the sampling functionality has been implemented in a Lawful Interception system.

FIG. 3 is a message and signalling chart illustrating the flow of messages when the sampling functionality is implemented in a Lawful Interception system, LI system. The new functionality is achieved by equipping the DF3 function of the mediation system in the IMDU, Intercept Mediation and Delivery Unit, with capability of sampling the received CC which is a result of intercepted IP flow, e.g. streamed data, belonging to a specific IP service. The samples of the CC related to a service may be marked with a proper service identifier and sent over the ETSI standardized HI3 interface to the Law Enforcement Agency, LEA.

The operator might use such mechanism to mark only the packets related to the premium service under the operator's direct responsibility. At the LEA, upon reception of the samples, the service identifier allows the immediate recognition of the samples of interest so enabling the real time decoding/monitoring of the service/content of interest.

In the message flow chart of FIG. 3, the flow of data information in the system and network arrangement is illustrated. The LEA sends to a Law Enforcement Management Function unit, LEMF, an intercept request for Legal Interception of the IP flow related to a special target of interest. The LEMF is configured to forward a LI activation request to the IMDU/Mediation system over the ETSI standardized HI1 interface. The intercept request is sent through the first Handover Interface, HI1, located between the LEMF and the node comprising Intercept Mediation and Delivery Unit, IMDU, which comprise the Administration Function, ADMF. The intercept request may be a LI activation request. The request specifies one or more target identities.

The IMDU is adapted to receive the intercept request specifying one or more targets as one or more target identities. When the request for LI activation is received, a warrant is generated by the ADMF based on said one or more target identities. The ADMF is further configured to send via the interface X1 said warrant towards an ICE, Intercepting Control Element, which is arranged to intercept IP traffic through a network operator's network forwarding Internet data traffic flows/streams. The request may comprise a single warrant requesting for information related to the target or targets.

The ICE is configured to receive the warrant specifying one or more services belonging to one or more target identities. By means of the target information in the request, the ICE is capable to to intercept the IP traffic of a specified target, who is using a certain communication service during his/hers session. The ICE is also configured to deliver the IRI report to the node comprising IMDU. The ICE is further configured to generate from the Intercepted signaling IRI data comprising metadata which is delivered to the IMDU/Mediation node via the interface X2. The IMDU generates an Intercept Related Information (IRI) report comprising information related to said one or more target identities upon receipt of said intercepted signaling.

The IMDU generates an HI1 notification that a warrant is sent to the ICE. The notification is sent by the IMDU to the LEMF and the LEA.

The Intercepted signaling relates to the target's session, which generates signaling and data traffic, and which triggers the Lawful Interception of the session to start.

When a session of a target starts, the ICE intercepts the session and the payload of the user data traffic is copied and sent over the X3 interface to the IMDU. The ICE intercepts said payload of the user data traffic, denoted as Content of Communications, CC. Said CC and IRI are network related data. As reference to the standard model, see references [1], [2] and [3], the content of communication is intercepted in the ICE network node and it is based upon duplication of target communication payload without modification.

The IMDU comprises a Delivery Function for IRI reporting, DF2, and a Mediation Function of IRI, MF2, that generates and delivers to the LEMF an IRI report based on the received IRI data, which comprises metadata and other information related to said one or more target identities. Said IRI report is sent over a standardized interface HI2 to the LEMF. When generating said IRI report related to a target identity, at least corresponding target and meta data information is inserted. The delivery functions are used to distribute the Intercept Related Information (IRI) to the relevant LEA(s) via HI2.

The IMDU comprises a Delivery Function for CC reporting, DF3, and a Mediation Function of CC, MF3, that generates and delivers to the LEMF samples of the CC based on the received session payload, which comprises information related to said one or more target identities. Said samples of the received CC are sent over a standardized interface HI3 to the LEMF as long as the session is ongoing.

The new aspect is a sampling function provided within the mediation system of the IMDU.

The different embodiments of the methods and arrangements to be described herein will be exemplified when applied to video services. However, a skilled person will understand that the methods and arrangements provide a network operator with means for performing the described sampling functionality of different services, e.g. VoIP (Voice over IP), IPTV (Internet TV), VoD (Video-on-Demand), Audio, Video etc., which may be of interest to be sampled by the IMDU before delivery over the HI3 interfaces.

On that basis, the system will provide capabilities for the real-time sampling of the payload received over X3 from traffic nodes. DF3 subsystem will be responsible for the sampling of the payload, i.e. Content of Communications and of the subsequent reporting of the samples before HI3 delivery.

Two new header fields are introduced—the frame number and the sample correlation Identification (Id):
  The frame number is present only on CC packet and it is used to correlated all packets belonging to the same frame/sample (same value for all packets belonging to the same frame).
  The sample Correlation Id is present on both IRI and CC packets in order to inform the LEA that the received IRI is related to the CC samples. It is the same number both on IRI and CC.

A proper sample correlation identifier is therefore appended to each packet header. Information in the headers may thus be used as correlation to improve the correlation of CC samples sent over the handover interface HI3 and the IRI report comprising metadata belonging to the same CC samples and target identity which report is sent over the handover interface HI2. In that case, the sample correlation Identifier would represent a new correlation identifier to be included within an IRI report, reporting the additional information about the service in the form of metadata, such as URL. Thus, the MF3 subsystem provides the MF2 subsystem with additional information that will be used to build metadata on flow-basis and delivered in proper IRI reports. Among the provided information to MF2, the sample correlation identifier will enhance the correlation of IRI record over HI2 with the associated payload delivered over HI3 and it will enable LEA in accessing to the proper payload, data packet per data packet, as referenced in the IRI and by just using the new correlation identifier.

The delivery over HI3 will provide the means to set the service identifier as a new parameter of the LI header on top of the supported Standard for HI3 delivery, the standard according to references [4], [5], [6], [7]. The number of IRI reports does not need to correspond with the number of sent HI3 CC samples.

The LEMF is adapted to receive the standardized IRI report with target data information related to said one or more target identities. Said information is provided to the requesting LEA, i.e. Law Enforcement Agency.

Figure 4:
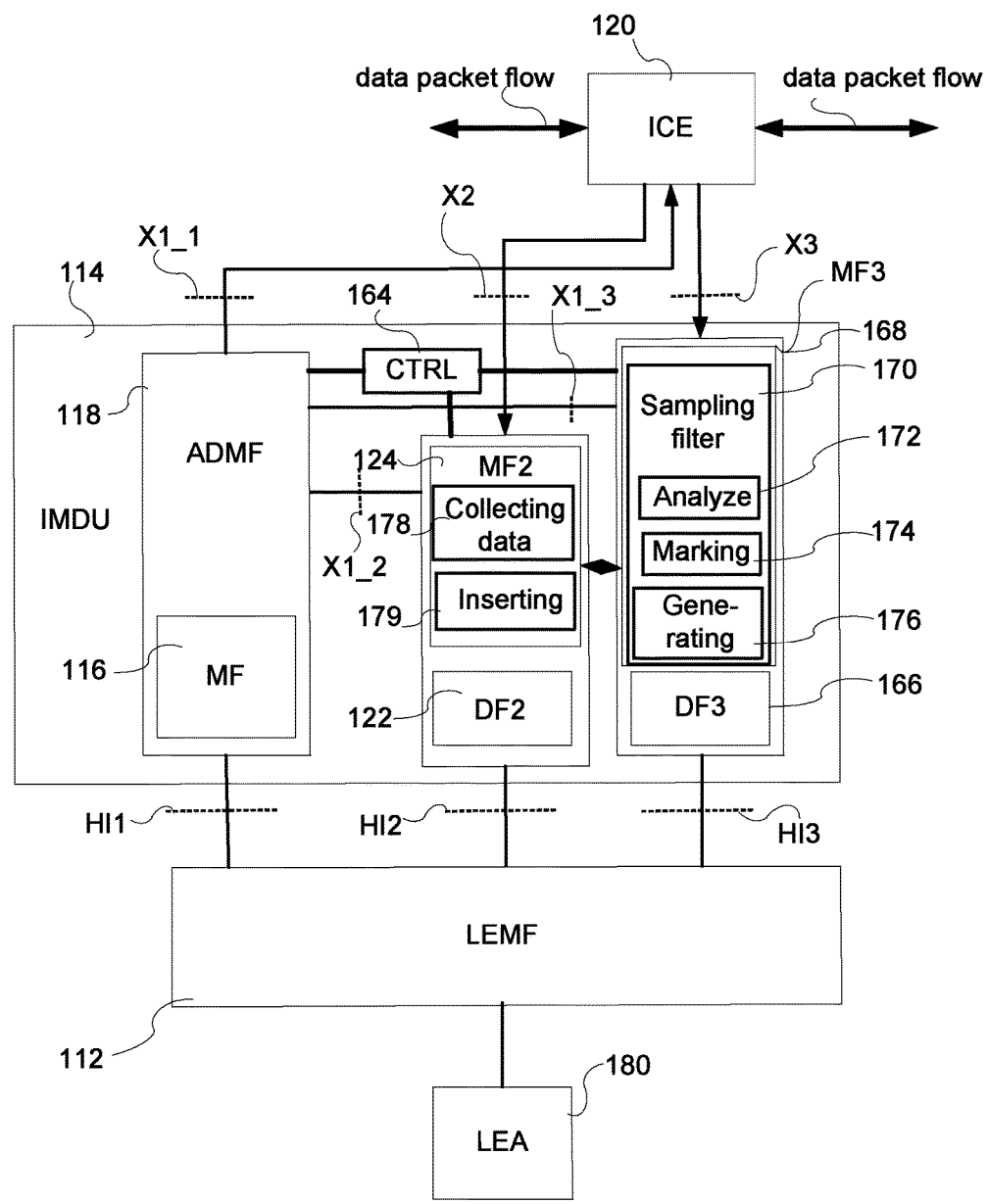
FIG. 4 is a block diagram illustrating an embodiment of an arrangement comprising the sampling functionality.

FIG. 4 is a block diagram of an exemplary embodiment of a LI system and network comprising an arrangement and embodiments thereof 114. This is an arrangement that is adapted to provide a LEA, Law Enforcement Agency, 180 with samples of the Content of Communication (CC) and Intercept Related Information (IRI) from one or more sessions related to one or more target identities. Of course, the system is also capable of sending the full CC of an intercepted service, if that is requested for by the LEA.

The LEA 180 sends a first LI request to a LEMF, Law Enforcement Management Function, 112. The first request specifies different kind of data and information for enabling Lawful Interception regarding data traffic flow of a specific target. An intercept request, also denoted Request for LI activation, is sent through a first Handover Interface, HI1, located between the Law Enforcement Management Function 112 and an IMDU, i.e. an Intercept Mediation and Delivery Unit, 114 comprising an Administration Function, ADMF, 118 involving a Mediation Function/Delivery Function, MF/DF, 116. Said Mediation Function 116 and Administration Function 118 generates based on said received request a warrant comprising said one or more target identities, and sends said warrant towards an Intercepting Control Element, ICE, 120 via an interface denoted X1_1. The ICE 120 is according to the illustrated embodiments situated in a node of a data communications network or telecommunications network which handles and distributes IP data packet flows from which the ICE intercepts Content of Communications, CC, and Intercept Related Information, IRI, of one or more target's communication sessions. Said CC and IRI are network related data. As reference to the standard model, see references [1], [2] and [3], the content of communication is intercepted in the ICE network traffic node and it is based upon duplication of target communication payload without modification. The Intercepting Control Element (ICE) 120 comprises a controller comprising a processor unit configured to control the circuitry, units, blocks and functionalities of the Intercepting Control Element 120 and other circuitry.

The ICE 120 is provided with a receiver unit to receive a request with a warrant specifying one or more targets as one or more target identities. The request is an order to intercept IP Data Traffic passing through the traffic node. The ICE 120 may be provided with data acquiring means for intercepting IP data traffic through the node using said one or more target identities.

Thus the ICE 120 is configured to collect payload data of the data stream related to one or more target identities for which interception has been requested. A sender in the ICE 120 is adapted to forward the collected data to an IMDU 114, who processes the data. Such a process may be filtering and conversion of the data to another format or standard. The processed data is delivered to a Law Enforcement Management Function 112 for further distribution to the requesting LEA 180.

The ICE 120 sends data of the intercepted payload via an interface X2 to a second Mediation Function entity MF2 124 and a Delivery Function entity DF2 122 for IRI reporting. The Mediation Function and Delivery Function, MF2/DF2, is configured to generate and deliver to the LEMF 112, which may comprise a Collection Functionality (not shown) in, an IRI report based on the received IRI report comprising metadata related to the CC sent over X3 and HI3. Said IRI report is sent over a standardized interface HI2 to the LEMF 112. The IRI reports comprises metadata is extracted from the application layer in any payload.

Thus, the IMDU 114 is configured to collect metadata from the received Intercept Related Information, insert said metadata into an Intercept Related Information, IRI, report and to forward the IRI report via the second Handover Interface HI2 to the LEA, having access to the LEMF 112, which may comprise a Collection Functionality CF. Said LEA could be regarded as a node in the LI system and network. According to one example, the IRI report may comprise at least one of the following metadata:
  URL;
  IP address;
  File name
  Sample correlation Id.

The delivery function unit DF2 122 is used to distribute the Intercept Related Information IRI to the relevant LEA or LEAs via HI2 via one or more LEMFs. The arrangement 114 is therefore adapted to provide a Law Enforcement Agency 180 with payload data of an intercepted data packet flow, e.g. Internet Protocol flow, IP flow, wherein the payload data belongs to one or more target identities using a specific Internet service.

The Intercept Mediation and Delivery Unit 114 also involves a third Mediation Function entity, MF3, and Delivery Function entity, DF3. The MF3 entity 168 is configured to receive intercepted payload data, i.e. Content of Communications (CC) from the Intercepting Control Element, ICE, 120. The intercepted payload belongs to one or more target identities using a specific Internet service, e.g. streaming video of a Video-on-Demand service.

The Intercept Mediation and Delivery unit 114 is configured to sample the CC according a certain sampling rate to achieve one or more samples of the CC, and to forward the generated one or more samples to a Law Enforcement Management Function LEMF unit 112, which may comprise a Collection Functionality CF, said LEMF being hosted by the Law Enforcement Agency LEA 180.

The MF3 168 comprises a sampling filter 170. The sampling is performed by means of a sampling algorithm in the sampling filter 170.

The sampling functionality will now be exemplified when applied on a CC, which is a video stream, which is composed of a sequence of video frames, as defined by video standards, e.g. H.263. The CC comprises data packets involving data packet headers, and the sampling filter 170 is configured to retrieve and analyse the data packet headers of the CC for locating a block of one or more data packets to be a sample. For this purpose, the sampling filter 170 is equipped with a retrieving and analyzing means 172, which may be implemented as software or computer program comprising instructions to be executed by a digital processor or computer device.

The proposed solution for finding eventually hidden video frame sequences in a video stream of a video file, such as a movie, is to retrieve single snapshots, i.e. samples, from a stream according to a configurable interval of time, herein denoted sample rate or frame generation time, Tg, and then deliver just the snapshots to the LEA instead of the whole CC content. Here below, there is the high level description of an algorithm related to the case of video streaming, which slices the video into single video frames to be delivered to the LEA. Said algorithm may be implemented in a sampling filter.

In the following example, one video frame may be split across a number of RTP (Real-Time Transport Packets data packets) involving data packet headers comprising a timestamp field and a marker bit. The RTP timestamp in the timestamp field shall be the same on successive packets if a video frame occupies more than one packet, as stated in RFC 4629. A marker bit indicates the start and the end of a video frame. The marker bit allows the identification of frame boundaries. In case of video frame it is possible to detect the end of a frame if the marker bit is set to one. Other packets referring to the same video frame carry the marker bit set to zero. The timestamp reflects the sampling instant of the first octet in the RTP data packet. All RTP packets referring to the same video frame bear the same timestamp.

The sampling filter 170 is therefore configured to analyze any packet header belonging to the video stream in order to check for information contained in the RTP packets: timestamp and marker bit. The sampling filter analyzes a block of packets every time instant according to a variable sampling rate, also denoted frame generation time, Tg, which is a configurable parameter interval of time used to trigger each sampling of the video stream. Said frame generation time may be requested by the LEA. For example, if the LEA requires one frame every minute, then Tg is equal to 60 seconds. A narrow interval of time increases the chance for the LEA to detect possible hidden content. On the other hand, higher intervals increase the bandwidth savings.

As an example, a 2 hours long movie (30 frames/s), which contains a 10 min of another video (i.e. instructions for manufacturing an explosive bomb). In this case, the total number of video frames is 216.000, if the interval of time for the algorithm sampling is 1 minute, which is quite good for detecting disguised hidden content, then the number of video frames sent to the LEA is 120 out of 216 000, which means a saving of 99.94% of the bandwidth needed for the whole movie.

Each of the RTP packets bearing the same timestamp is selected, copied and encapsulated into a Lawful Intercept container involving a Lawful Intercept header comprising a correlation field denoted frame number. The last of the RTP packet in a sample is detected by analyzing the marker bit of each RTP packet. Said marker bit is set to "1" (one), while the marker bit of the previous data packets of the sample is set to "0" (zero).

Thus, the sample comprises one or more data packets, each data packet involving a Lawful Intercept header comprising at least one of the following data:
  Frame number;
  Type;
  Timestamp:
  Samples correlation Id.

The IMDU 114 is configured to provide each data packet with a LI header and to mark the LI header with said data and other data, e.g. for addressing the container to the correct LEMF 112 and LEA 180. The sampling filter 170 of the MF3 168 may therefore be provided with a marker means 174, which may be implemented as software or computer program comprising instructions to be executed by a digital processor or computer device.

Frame number is a number used to correlate all data packets of a video frame. The frame number increments by one for each sent video frame and may be used by the receiver to detect frame loss and to restore frame sequences. The number is generated by IMDU 114, e.g. the marker means 174, which is further configured to insert the frame number into each header to be sent. As an example, a LEA requested the filtering of video streaming for a specific target, but it requires samples of filtered payload to detect hidden content. If the LEA finds a hidden content in a video stream, it can use the frame number for reordering the frame sequences, and timestamp for identifying the piece of content hidden into the video.

Type is an identifier parameter which identifies for the LEA and/LEMF which kind of data the CC comprises. Type identifies for one example the video type, e.g. H.263, and determines its interpretation by the LEA application. Type is retrieved by the marker means 174 from the headers of the data packets being a part of each sample. The marker means 174 is configured to insert the Type identifier parameter into each header to be sent.

Timestamp is retrieved from the header of data packets, e.g. RTP, being a part of the sample. The marker means 174 is configured to insert the timestamp into each header to be sent.

A sample correlation Id (may also be denoted Samples correlation Id) is a number used to correlate IRI and CC. It allows the LEA to associate received video frames to a specific metadata. Thus, it is generated by the IMDU 114, e.g. the marker means 174. It is inserted both in the LI header of CC sent over HI3 interface and in the metadata inserted in the IRI report.

The sampling filter 170 of the IMDU 114 is configured to generate each sample by gathering data packets having the same timestamp in the timestamp field. The sampling filter 170 is therefore equipped with a gathering means 176, which may be implemented as software or computer program comprising instructions to be executed by a digital processor or computer device.

The retrieved video frame (one or more RTP packets) is then sent to the LEA over the HI3 interface.

The Delivery Function 3, DF3, 166 provided in the IMDU is configured to forward via the handover interface HI3 the generated one or more samples to the LEA 180, via said third Handover Interface HI3 and a LEMF, 112, that may involve a Collection Functionality (CF).

According to some embodiments of the arrangement, the Intercept Mediation and Delivery Unit 114 may comprise a second Mediation Function MF2 124, which is configured to generate and forward an Intercept Related Information IRI report via the second Handover Interface HI2 to the Law Enforcement Agency. Said report comprises at least metadata which is based on the received IRI data which is sent to the Law Enforcement Agency via the handover interface HI2.

In more detail, the Intercept Mediation and Delivery Unit 114 of the arrangement is configured to collect metadata from the received Intercept Related Information, e.g. data regarding the target and the targets intercepted service. The MF2 124 is therefore equipped with a collecting means 178, which may be implemented as software or computer program comprising instructions to be executed by a digital processor or computer device.

The IMDU is further configured to insert said metadata into an Intercept Related Information, IRI, report and to forward the IRI report via a second Handover Interface HI2 to the Law Enforcement Management Function unit 112. The MF2 124 is therefore equipped with an inserting means 179, which may be implemented as software or computer program comprising instructions to be executed by a digital processor or computer device.

The IRI report may comprise at least one of the following metadata, which may be inserted by the inserting means 179 of MF2 124 into the metadata inserted in the IRI report:
  URL;
  IP address;
  File name
  Sample correlation Identification.

URL (Uniform Resource Locator) is the URL of the intercepted CC stream. IP address is the IP address of the source. File name, if available, may be used for identifying the intercepted CC stream, e.g. the name of a movie to which the intercepted video stream belongs. A sample correlation Identification (Id) (may also be denoted Samples correlation Id) is a number used to correlate IRI and CC. It allows the LEA to associate received video frames to a specific metadata. Thus, it is generated by the IMDU 114, e.g. the marker means 174. The Sample correlation Id is therefore received from the MF3 168. The marker means 174 is configured to insert the sample correlation Identification (Id) in the LI header of CC sent over HI3 interface and to send said Id to the inserting means 179 of MF2 124, which means 179 receives and inserts the Identification into the metadata inserted of the IRI report.

The IMDU 114 of the arrangement is configured to receive, from the LEA node 180 via Law Enforcement Management Function unit 112, a request to intercept data traffic related to one or more target identities via a first Handover Interface, HI1. Said request involves a request for sending samples of the CC, and not the whole CC content, back to the LEA node 180. The Intercept Mediation and Delivery Unit 114 is configured to receive, from the Law Enforcement Management Function unit 112 and/or LEA node 180, the request to intercept data traffic related to one or more target identities via a first Handover Interface HI1 to IMDU 114, said request involving a request for sending samples of the CC back to the Law Enforcement Agency node. The ADMF 118 is configured to distribute the request for sampling via interfaces X1_2 and X1_3 to MF2 124 and MF3 168, respectively, wherein the sampling request is stored. When payload data and/or CC related to a certain target is identified by the MF2 and MF3, said payload may be sampled if the payload data/CC is identified to be intercepted from a data packet stream comprising, e.g. video data packets.

As a summary, the arrangement comprises an IMDU 114, which comprises a Delivery Function, DF2, 122 for Intercept Related Information (IRI) reporting and for receiving IRI data via an interface X2 from an Intercepting Control Element, ICE, 120 and a Mediation Function, MF2, 124 of IRI that generates and delivers standardized IRI reports, based on the received IRI over the standardized second interface HI2 to a Law Enforcement Management Function unit to a LEA 180, via an LEMF 112, that may comprise a Collection Functionality, CF. Said IMDU 114 may further comprise a Delivery Function, DF3, 166 for Content of Communications, CC, reporting of received CC via an interface X3 and a Mediation Function, MF3, 168 of CC which generates a CC report, based on the received CC, over a standardized third interface HI3 to the LEA 180, via the LEMF 112, via the CF. The Mediation Function MF3, 168, comprises a sampling filter 170 configured to sample the CC according a certain sampling rate to achieve one or more samples of the CC. The Delivery Function 3, DF3, 166 provided in the IMDU may be configured to forward via a handover interface HI3 the generated one or more samples to the LEA 180, via said third Handover Interface HI3 and a LEMF, 112, that may involve a Collection Functionality (CF) for collecting the information sent over HI2 and HI3.

The intercepted packets of the payload related to a target may be labeled in the operator domain by means of a dedicated service identifier. Network operators are provided with the means for the administration of the function, in order to specify the services that are of interest for being classified by the mediation system MF before that the related payload was delivered over HI3.

The IMDU 114 comprises a controller, CTRL, 164 for implementing and controlling the operation of the IMDU. Said controller 164 may be implemented by a digital processor or a number of processors, or similar, and computer software. Said processor or processors may be designed and distributed in a number of ways, e.g. one processor serving all different entities or one processor in each entity of the IMDU. Said processor or processors is/are configured to perform a method and embodiments thereof by means of computer program software, wherein said method and embodiments provide the sampling functionality, which method and embodiments thereof are described hereafter with reference to FIGS. 5-8.

Figure 5:
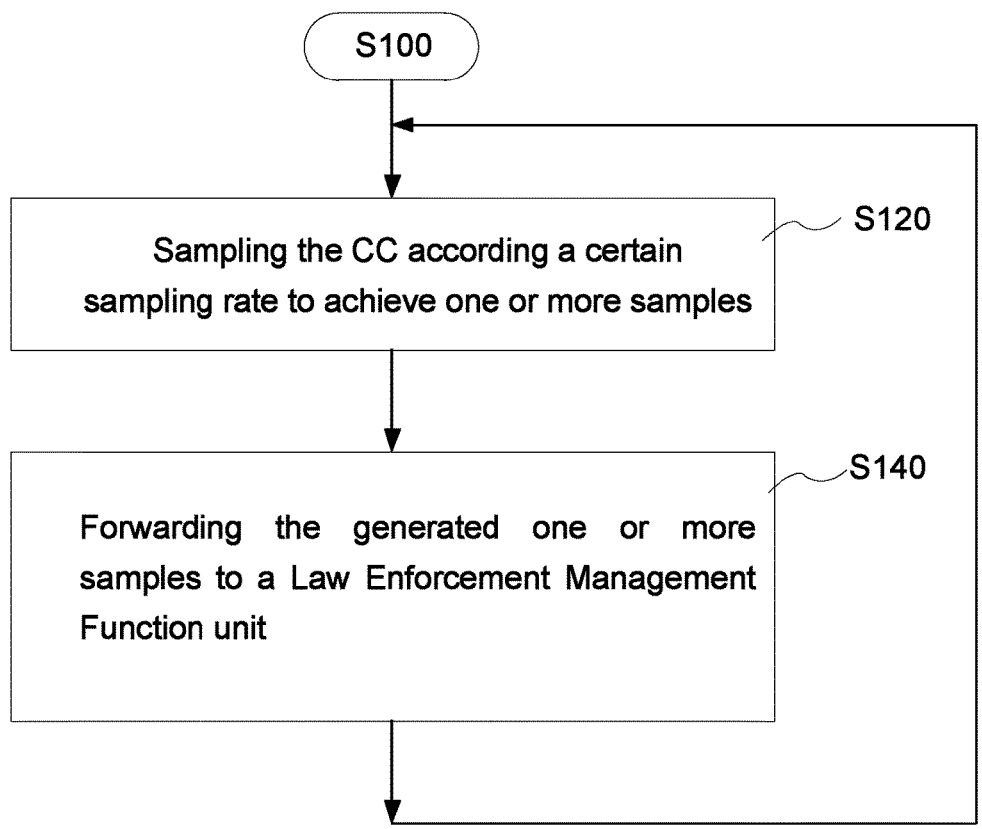
FIG. 5 is a flowchart illustrating an embodiment of a method comprising the sampling functionality.

FIG. 5 is a flowchart illustrating one embodiment of a method S100 for providing a Law Enforcement Agency, LEA, 200 with payload data of intercepted data traffic or data communication flow, the payload data belonging to one or more target identities using a specific service. The method is described mentioning blocks, units, circuitry and components which have been already described with reference to FIG. 4. The method S100 comprises:

S120: Sampling the CC according to a certain sampling rate to achieve one or more samples. The arrangement 114 comprises an Intercept Mediation and Delivery Unit 114, which involves a Mediation Function/Delivery Function MF3/DF3 168/166. The MF3 168 comprises a sampling filter 170 configured to receive intercepted payload data from an ICE 120, i.e. Intercepting Control Element 120, in the LI system arrangement 114. The ICE is situated in a traffic node of a communications network. The intercepted payload belongs to one or more target identities using a specific Internet service. The sampling filter analyzes a block of packets every time instant according to a variable sampling rate, also denoted frame generation time, Tg, which is a configurable parameter interval of time used to trigger each sampling of the video stream. Said frame generation time may be requested by the LEA.

The method S100 further comprises:

S140: Forwarding the generated one or more samples to the Law Enforcement Agency 180. The Intercept Mediation and Delivery Unit 114 involves a Delivery Function DF3 166 for delivering the samples to the LEA 180. The IMDU 114 is configured to forward via the handover interface HI3 the marked IP packets of the received payload data CC to the LEMF 112 to be collected by the Law Enforcement Agency.

The above described method embodiment stops when no more is received from the intercepted target session, and the IMDU returns to a standby state wherein it is waiting for new interception to start.

Figure 6:
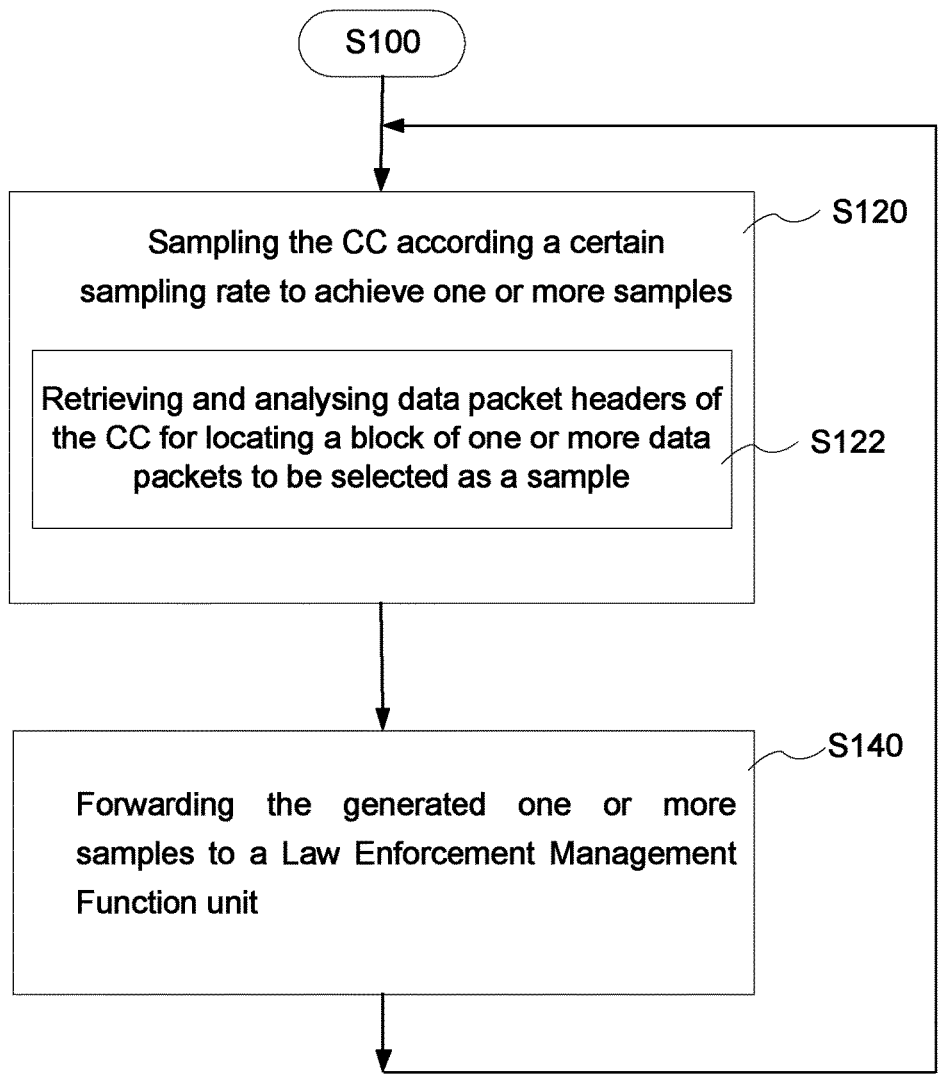
FIG. 6 is a flowchart illustrating further one embodiment of a method comprising the sampling functionality.

Further one embodiment of the above described method is presented in FIG. 6. According to said embodiment, the sampling step further comprises:

S122: Retrieving and analysing the data packet headers of the CC for locating a block of one or more data packets to be a sample. The sampling filter 170 is configured to retrieve and analyse the headers of the data packets in the CC for locating a block of data packets, e.g. a video frame, to be selected. The sampling filter 170 is equipped with a retrieving and analyzing means 172, which may be implemented as software or computer program comprising instructions to be executed by a digital processor or computer device. In the described example, one video frame may be split across a number of RTP (Real-Time Transport Packets data packets) involving data packet headers comprising a timestamp field and a marker bit. The RTP timestamp shall be the same on successive packets if a video frame occupies more than one packet. A marker bit indicates the start and the end of a video frame. The marker bit allows the identification of frame boundaries. In case of video frame it is possible to detect the end of a frame if the marker bit is set to one. Other packets referring to the same video frame carry the marker bit set to zero. The timestamp reflects the sampling instant of the first octet in the RTP data packet. All RTP packets referring to the same video frame bear the same timestamp.

The above described method embodiment stops when no more is received from the intercepted target session, and the IMDU returns to a standby state wherein it is waiting for new interception to start.

Figure 7:
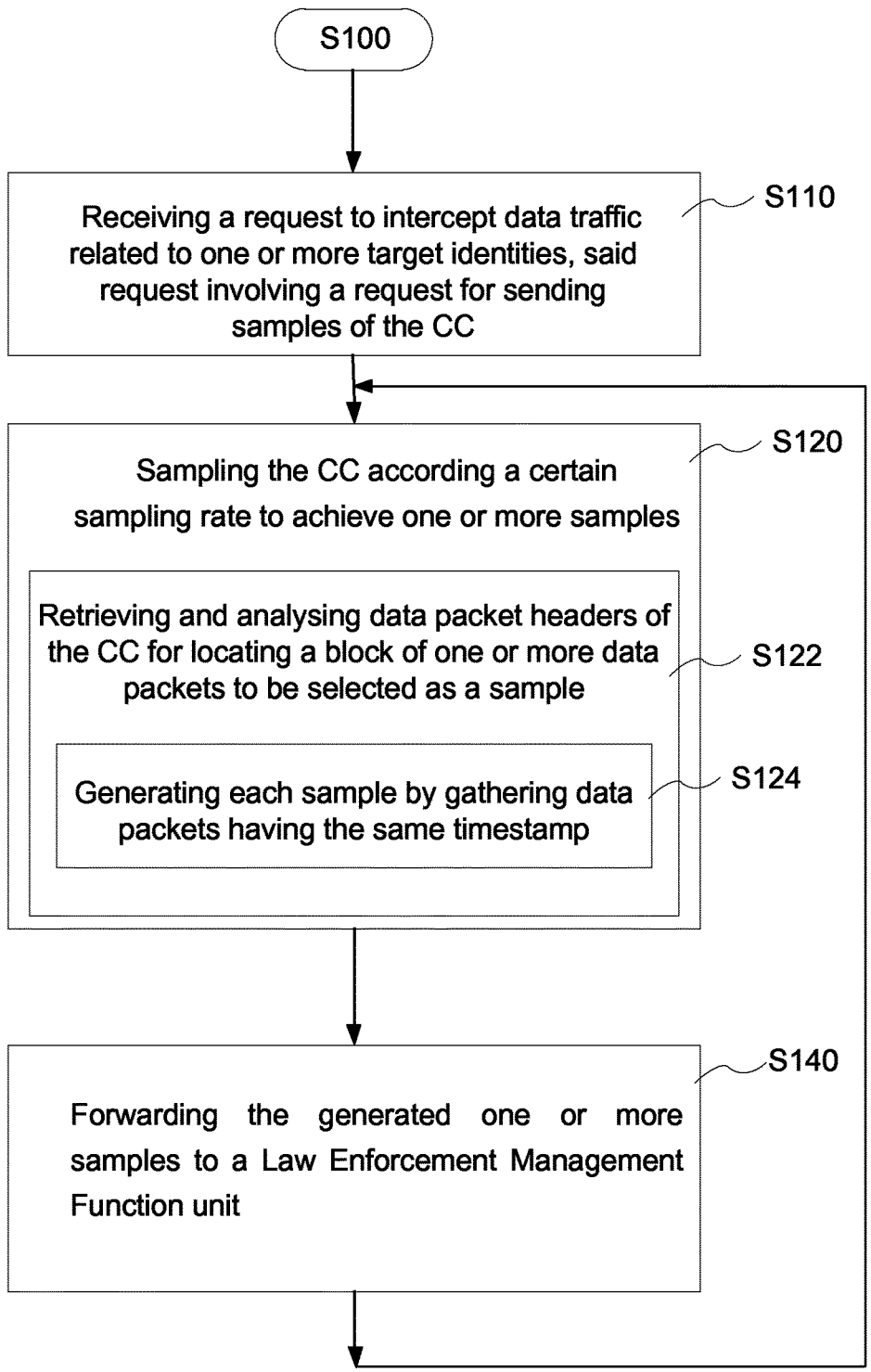
FIG. 7 is a flowchart illustrating yet another embodiment of a method comprising the sampling functionality.

Further one embodiment of the above described methods is presented in FIG. 7.

S110: Receiving a request to intercept data traffic related to one or more target identities, said request involving a request for sending samples of the CC. The Intercept Mediation and Delivery Unit 114 is configured to receive, from the Law Enforcement Management Function unit 112 and/or LEA node 180, the request to intercept data traffic related to one or more target identities via a first Handover Interface HI1 to IMDU 114, said request involving a request for sending samples of the CC back to the Law Enforcement Agency node. The ADMF 118 is configured to distribute the request for sampling via interfaces X1_2 and X1_3 to MF2 124 and MF3 168, respectively, wherein the sampling request is stored. When payload data and/or CC related to a certain target is identified by the MF2 and MF3, said payload may be sampled if the payload data/CC is identified to be intercepted from a data packet stream comprising, e.g. video data packets.

According to said method, the sampling of the payload data may also involve:

S124: Generating each sample by gathering data packets having the same timestamp. The sampling filter 170 is configured to generate each sample by gathering data packets having the same timestamp in the timestamp field. The sampling filter 170 is therefore equipped with a gathering means 176, which may be implemented as software or computer program comprising instructions to be executed by a digital processor or computer device.

The above described method embodiment stops when no more is received from the intercepted target session, and the IMDU returns to a standby state wherein it is waiting for new interception to start.

Figure 8:
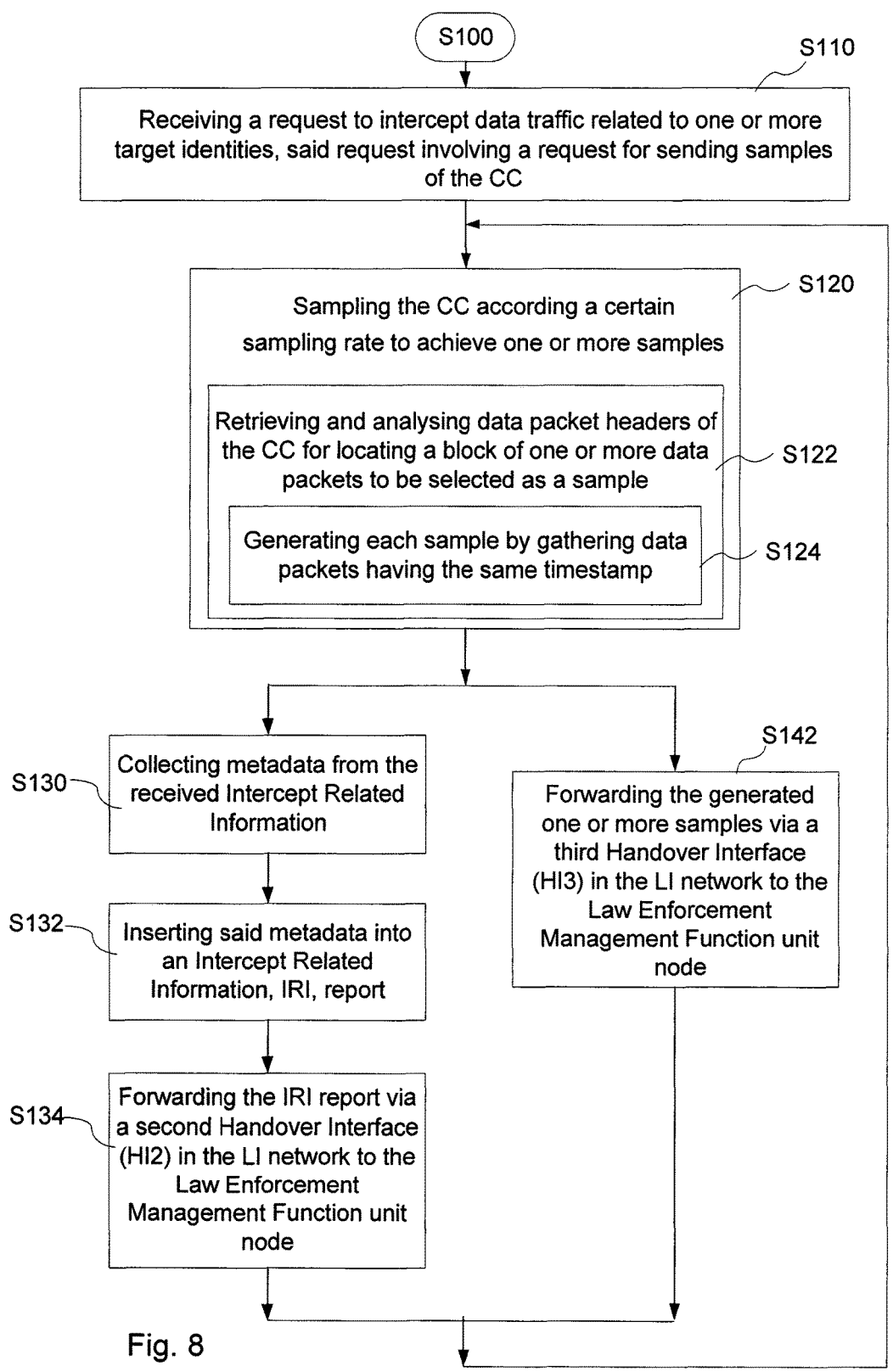
FIG. 8 is a flowchart illustrating another example of an embodiment of a method comprising the sampling functionality—

Further one embodiment of the above described methods is presented in FIG. 8. According to the embodiment, the forwarding of the marked IP packets of the received payload data also involves:

S142: Forwarding the generated one or more samples via a third Handover Interface (HI3) in the LI network to the Law Enforcement Management function unit node 112. The Delivery Function 3, DF3, 166 provided in the IMDU is configured to forward via the handover interface HI3 the generated one or more samples to the LEA 180, via said third Handover Interface HI3 and a LEMF, 112, that may involve a Collection Functionality (CF).

S130: Collecting metadata from the received Intercept Related Information. In more detail, the Intercept Mediation and Delivery Unit 114 of the arrangement comprises a collecting means, which is configured to collect metadata from the received Intercept Related Information, e.g. data regarding the target and the targets intercepted service. The MF2 124 is therefore equipped with a collecting means 178, which may be implemented as software or computer program comprising instructions to be executed by a digital processor or computer device.

S132: Inserting said metadata into an Intercept Related Information, IRI, report. The IMDU 114 is further configured to insert said metadata into an Intercept Related Information, IRI, report and to forward the IRI report via a second Handover Interface (HI2) to the Law Enforcement Management Function unit 112. The MF2 124 is therefore equipped with an inserting means 179, which may be implemented as software or computer program comprising instructions to be executed by a digital processor or computer device.

The IRI report may comprise at least one of the following metadata:

URL;
IP address;
File name
Sample correlation Identification.
Said metadata has been described above.

S134: Forwarding the IRI report via a second Handover Interface HI2 in the LI network to the Law Enforcement Agency. The Intercept Mediation and Delivery Unit 114 may comprise a second Delivery Functionality DF2 122, which is configured to forward an Intercept Related Information IRI report via the second Handover Interface HI2 to the Law Enforcement Agency. Said report comprises at least metadata which is based on the received IRI data which is sent to the Law Enforcement Agency via the handover interface HI2.

The above described method embodiment stops when no more is received from the intercepted target session, and the IMDU returns to a standby state wherein it is waiting for new interception to start.

The proposed embodiments of different arrangements, entities and methods may be implemented in digital electronically circuitry, or in computer hardware, processor, firmware, software, or in combinations of them. Said embodiments may be implemented in a computer program product tangibly embodied in a machine readable storage device for execution by a programmable processor; and method steps of the invention may be performed by a programmable processor executing a program of instructions to perform functions of the invention by operating on input data and generating output.

The described entity IMDU 114 and its blocks, means and units may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

A computer program product comprising computer program code loadable into a processor, wherein the computer program comprises code adapted to perform of one or more of the steps of the method embodiments described herein, when the computer program code is executed by the processor.

Generally, a processor, e.g. in a controller, will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

The described embodiments comprising the new sampling function provide a number of advantages.

It provides solutions which makes a smart usage of the available bandwidth allows operators to respond the LEA needs in their country by saving investments in bandwidth and transport expenses.

LEA is provided with the means to discover hidden content exchanged among their targets without cumbersome and non-relevant data by saving investments in storage and transport expenses.

The different embodiments of the methods and arrangements herein have been exemplified when applied to video services. The examples should not be considered as a limitation. A skilled person understand that the methods and arrangement herein provides a network operator with means for performing the described sampling functionality of different services, e.g. VoIP (Voice over IP), IPTV (Internet TV), VoD (Video-on-Demand), Audio, Video etc., which may be of interest to be sampled by the IMDU before delivery over HI3.

A number of embodiments of the present invention have been described. It will be understood that various modifications may be made without departing from the scope of the invention. Therefore, other implementations are within the scope of the following claims defining the invention.

The invention claimed is:

1. A method in an Intercept Mediation and Delivery unit (IMDU) node in a Lawful Interception (LI) network, the method comprising:
    providing a Law Enforcement Agency with Intercept Related Information (IRI) and Content of Communications (CC) from data traffic in a digital communications network, said data traffic being related to one or more target identities and interceptable by an Intercepting Control Element in a common node of said LI network and digital communications network, wherein said Intercepting Control Element being configured to receive a request to intercept data traffic related to one or more target identities, collect IRI and CC related to said one or more requested target identities, and forward the IRI and CC to the IMDU node of the LI network;
    receiving the IRI and CC from said Intercepting Control Element;
    sampling the CC according a certain sampling rate to achieve one or more samples;
    retrieving and analyzing data packet headers of the CC for locating a block of one or more data packets to be selected as a sample;
    generating each sample based on the located block of data by gathering data packets having the same timestamp; and
    forwarding the generated one or more samples to the Law Enforcement Agency.

2. The method according to claim 1, wherein the intercepted data traffic involves a video stream, comprising a sequence of frames, said frames being split across a number of data packets involving data packet headers comprising a timestamp field and a marker bit, said marker bit indicates the start and the end of a frame.

3. The method according to claim 1, wherein forwarding the generated one or more samples comprises:
    forwarding the generated one or more samples via a third Handover Interface in the LI network to a Law Enforcement Management Function unit.

4. The method according to claim 1, wherein a sample comprises one or more data packets, each data packet involving a Lawful Intercept header comprising at least one of the following data:
    frame number;
    type;
    timestamp; or
    samples correlation Identification.

5. The method according to claim 1, the method further comprising:
collecting metadata from the received IRI;
inserting said metadata into an IRI report; and
forwarding the IRI report via a second Handover Interface in the LI network to the Law Enforcement Agency.

6. The method according to claim 5, wherein the IRI report may comprise at least one of the following metadata:
URL;
IP address;
file name; or
sample correlation Identification.

7. The method according to claim 1, wherein the method further comprises:
receiving a request to intercept data traffic related to one or more target identities, said request involving a request for sending samples of the CC.

8. An Intercept Mediation and Delivery unit (IMDU) node of a Lawful Interception (LI) network, configured to provide a Law Enforcement Agency with Intercept Related Information (IRI) and Content of Communications (CC) of data traffic in a digital communications network, the IMDU comprising:
components comprising hardware to provide a Law Enforcement Agency with Intercept Related Information (IRI) and Content of Communications (CC) from data traffic in a digital communications network, said data traffic being related to one or more target identities and interceptable by an Intercepting Control Element in a common node of said LI network and digital communications network, wherein said Intercepting Control Element being configured to receive a request to intercept data traffic related to one or more target identities, collect IRI and CC related to said one or more requested target identities, and forward the IRI and CC to the IMDU node of the LI network;
components comprising hardware to receive the IRI and CC from said Intercepting Control Element;
a sampling filter configured to sample the CC according a certain sampling rate to achieve one or more samples of the CC, to retrieve and analyze data packet headers of the CC for locating a block of one or more data packets to be selected as a sample, and to generate each sample based on the located block of data by gathering data packets having the same timestamp; and
an interface configured to forward the generated one or more samples to the Law Enforcement Agency.

9. The IMDU node according to claim 8, wherein the intercepted data traffic involves a video stream which is composed of a sequence of frames, said frames being split across a number of data packets involving data packet headers comprising a timestamp field and a marker bit, said marker bit indicates the start and the end of a frame.

10. The IMDU node according to claim 8, wherein the interface is a third Handover Interface.

11. The IMDU node according to claim 8, wherein each of the one or more samples comprises one or more data packets, each data packet involving a Lawful Intercept header comprising at least one of the following data:
frame number;
type;
timestamp; or
samples correlation Identification.

12. The IMDU node according to claim 8, further configured to:
collect metadata from the received IRI;
insert said metadata into an IRI report;
forward the IRI report via a second Handover Interface to the Law Enforcement Agency node.

13. The IMDU node according to claim 12, wherein the IRI report may comprise at least one of the following metadata:
URL;
IP address;
file name; or
sample correlation Identification.

14. The IMDU node according to claim 8, wherein the IMDU node is further configured to receive, from the Law Enforcement Management Function unit node, the request to intercept data traffic related to one or more target identities via a first Handover Interface of the IMDU node, said request involving a request for sending samples of the CC back to the Law Enforcement Agency node.

15. A non-transitory computer readable medium comprising a memory to store computer program code loadable into a processor, which when executed in the processor causes an Intercept Mediation and Delivery Unit (IMDU) to:
provide a Law Enforcement Agency with Intercept Related Information (IRI) and Content of Communications (CC) from data traffic in a digital communications network, said data traffic being related to one or more target identities and interceptable by an Intercepting Control Element in a common node of said LI network and digital communications network, wherein said Intercepting Control Element being configured to receive a request to intercept data traffic related to one or more target identities, collect IRI and CC related to said one or more requested target identities, and forward the IRI and CC to the IMDU node of the LI network;
receive the IRI and CC from said Intercepting Control Element;
sample the CC according a certain sampling rate to achieve one or more samples;
retrieve and analyze data packet headers of the CC for locating a block of one or more data packets to be selected as a sample;
generate each sample based on the located block of data by gathering data packets having the same timestamp; and
forward the generated one or more samples to the Law Enforcement Agency.

* * * * *